May 12, 1959 D. T. N. WILLIAMSON ET AL 2,886,717
MEASURING APPARATUS
Filed March 12, 1954 5 Sheets-Sheet 2

INVENTORS
David Theodore Nelson Williamson.
Alexander Turnbull Shepherd.
George Sanderson Walker.
BY
Cameron, Kerkam & Sutton
ATTORNEYS

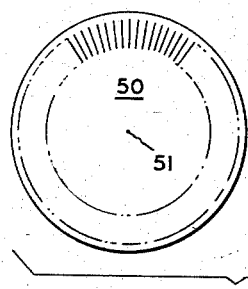
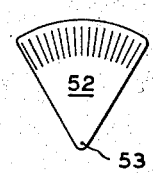
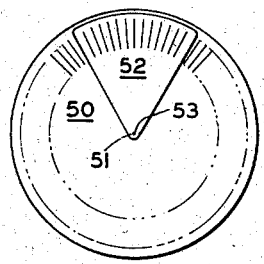
Fig. 6.   Fig. 7.
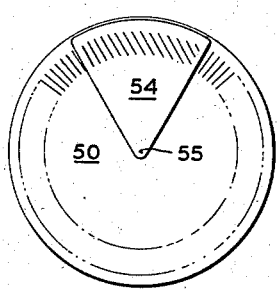
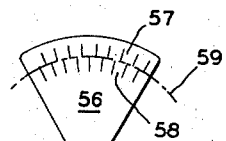
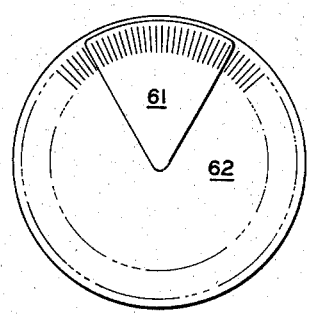
Fig. 8.   Fig. 9.   Fig. 10.
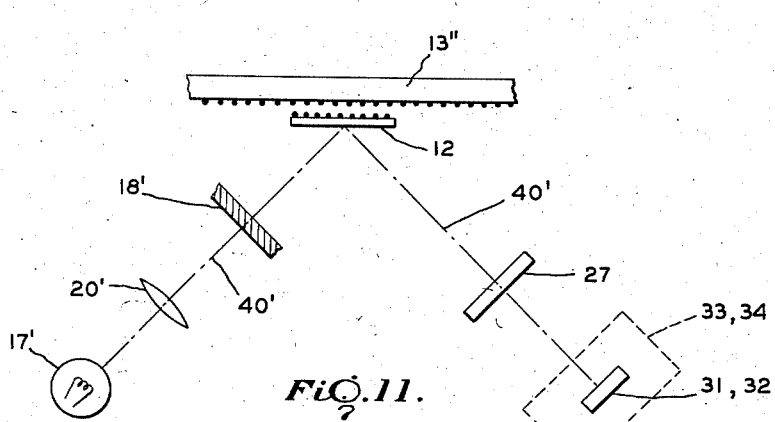
Fig. 11.
INVENTORS
David Theodore Nelson Williamson.
Alexander Turnbull Shepherd.
George Sanderson Walker.
BY Cameron, Kirkam & Sutton
ATTORNEYS May 12, 1959     D. T. N. WILLIAMSON ET AL     2,886,717
MEASURING APPARATUS
Filed March 12, 1954     5 Sheets-Sheet 4

INVENTORS
David Theodore Nelson Williamson
Alexander Turnbull Shepherd
George Sanderson Walker
BY
Cameron, Kirkam & Sutton
ATTORNEYS May 12, 1959  D. T. N. WILLIAMSON ET AL  2,886,717
MEASURING APPARATUS
Filed March 12, 1954                     5 Sheets-Sheet 5

INVENTORS
David Theodore Nelson Williamson
Alexander Turnbull Shepherd
George Sanderson Walker
BY
Cameron, Kerkam & Sutton
ATTORNEYS United States Patent Office 2,886,717
Patented May 12, 1959

2,886,717

MEASURING APPARATUS

David T. N. Williamson, Alexander T. Shepherd, and George S. Walker, Edinburgh, Scotland, assignors to Ferranti Limited, Hollinwood, England, a company of Great Britain and Northern Ireland Application March 12, 1954, Serial No. 415,942

Claims priority, application Great Britain March 14, 1953

22 Claims. (Cl. 250—220)

This invention relates to measuring apparatus for determining the extent and sense of the movement of an object in one or other of two opposite directions with respect to some reference structure.

This invention has particular but not exclusive application to the measurement of the movement of a machining tool with respect to the bed of the machine. It will be appreciated that for precision machining this measurement must be made to a very high order of accuracy. It is known to effect such a measurement by arranging for an optical fringe pattern to be moved in correspondence as regards extent and sense with the movement of the object and counting the number of fringes displaced from a fiducial line. As far as we are aware, however, no prior arrangement of this kind gives an indication of the direction of the movement.

It should however be understood that the invention is not confined to this application. It may for example be used as a strain gauge, an extensometer, or other instrument in which the extent and sense of the movement in one or other of two opposite directions of an object with respect to some reference structure is to be precisely determined.

An object of the present invention is to provide an improved measuring apparatus for the purpose stated.

Another object is to provide measuring apparatus for the purpose stated which affords a highly accurate indication of the movement concerned.

In accordance with the present invention, apparatus for determining the extent and sense of the movement of an object in one or other of two opposite directions with respect to some reference structure comprises two superimposed optical gratings, one secured to said structure and the other to said object, said gratings being ruled to produce together a cyclic coincidence pattern of alternate opacities and transparencies adapted to move with respect to said structure in dependence on the said movement of said object, means for illuminating said pattern at two locations where the elements of the pattern are out of phase with one another by a fraction of half the cyclic wavelength of the pattern, two photo-electric devices arranged to be illuminated by the light from said elements of the pattern respectively, and electrical stages for determining the extent and sense of the said movement of said object from the frequency and relative phase of the electrical output signals from said photo-electric devices.

In the accompanying drawings,

Figure 11 is a simplified plan view of an alternative form of part of the apparatus of Fig. 1.

The terms "opaque" and "opacity" are used throughout this specification in the sense "non-light-transmitting," whether the non-transmission is due to absorption or total internal reflection. The term "light-transmitting material" as used in the appended claims is intended to be generic to material which transmits light either by passage therethrough or by reflection.

Figure 1:
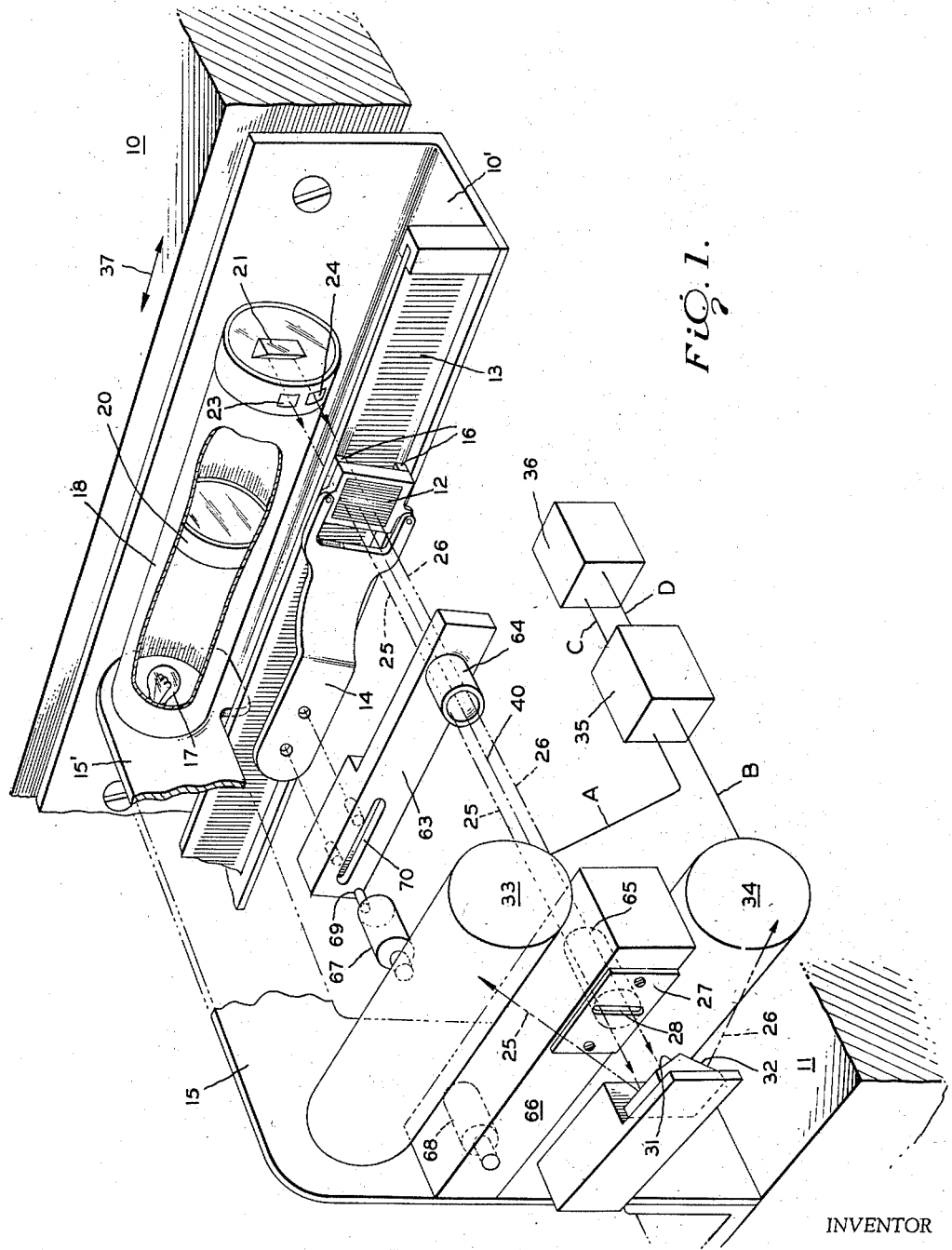
Figure 1 is an exploded view in perspective of apparatus in accordance with one embodiment of the invention.

The invention will now be described by way of example as used for determining the extent and direction of the straight-line movement of a table 10—see Fig. 1—of a milling machine with respect to the fixed bed 11 of the machine. Two superimposed optical transmission gratings 12 and 13 are provided. Grating 12 is mounted at one end of a cantilever spring 14 which is carried by a bracket 15 in a manner to be described. Bracket 15 is secured to the bed 11 of the machine. Grating 13, which is long enough to allow for the full movement of the table 10, is secured to the table by means of an angle iron 10¹. The gratings are of glass or other transparent or translucent material ruled with straight and parallel opaque lines at a spacing which is approximately the same for each grating; about 5000 opaque lines per inch is typical, but coarser or finer spacings may be adopted if desired. The width of each opaque line is approximately equal to the width of each transparent line between consecutive opaque lines. Each grating is such that the lines on it are co-planar.

The lines of grating 13 are normal to the direction of movement of the table. It will be assumed for convenience of explanation that this direction is horizontal and that accordingly the lines of grating 13 are vertical. The mounting of spring 14 is arranged so that grating 12 may be adjustably rotated to incline its lines to a slight extent from the vertical, thereby rendering the lines of the two gratings slightly skew with respect to each other. Spring 14 presses grating 12 towards grating 13; actual contact between the two gratings is prevented by means of two horizontal strips 16 of anti-friction material secured at top and bottom of grating 12.

The gratings are illuminated by a lamp 17 mounted in a housing 18 carried by an extension 15¹ of bracket 15. The lamp has a vertical line filament and the light from this reaches the gratings by way of a collimating lens 20, an approximately 45 degree mirror 21, and apertures 23 and 24 in the otherwise opaque wall of housing 18. These apertures are displaced from each other in a direction approximately parallel to the lines—that is, vertically, in this embodiment—at a distance apart which will be indicated later. From these apertures two beams of light indicated by broken lines 25 and 26 pass through the superimposed gratings. In the path of these beams beyond the gratings is disposed a screen 27 having an aperture in the form of a vertical slot 28 for a purpose which also will be indicated later. Beyond the screen 27 is disposed a pair of inclined mirrors 31 and 32 in the paths of beams 25 and 26 respectively; these mirrors deflect the beams to photocells 33 and 34 respectively, which are shielded from all other light.

The electrical output signals from photocells 33 and 34 are applied over separate leads A and B respectively to a discriminating stage 35 arranged to generate a train of pulses having a repetition frequency dependent on the frequency of the signals from the photocells and to deliver this train of pulses over an output lead C only, or over an output lead D only, in dependence on the relative phase of the photocell signals. Leads C and D are coupled to a differential counter 36 arranged to add the pulses received over lead C and subtract from the count the pulses received over lead D.

Figure 2:
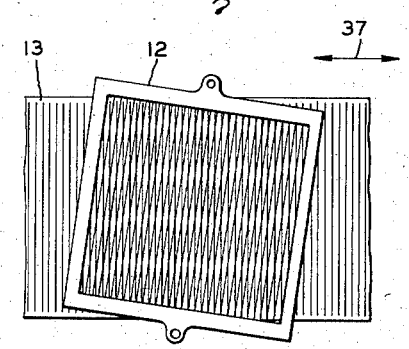
Figure 2 is a detail to an enlarged scale of part of the apparatus shown in Fig. 1, Figures 3   5, 5a and 6 to 10 show alternative forms of the detail of Fig. 2.

Owing to the skew relationship of the two gratings they produce together a cyclic coincidence pattern of alternate opacities and transparencies as shown in Fig. 2, in which the thickness and spacing of the lines and the angle of skew have been greatly exaggerated. The linear movement of grating 13 relative to grating 12 causes this pattern to move in a direction normal to the direction 37 of the movement of grating 13. The pattern thus moves vertically, in which direction apertures 23 and 24 through which the two elements are illuminated, are spaced. The apertures are so located in relation to the angle of skew that these elements are out of phase with one another by a fraction of half the cyclic wavelength of the pattern. This fraction is adjustable by adjusting the angle of skew of grating 12 in a manner to be described; to obtain the most effective result the fraction should be one half, that is to say, the two elements are in quadrature.

As grating 13 moves relative to grating 12 therefore, the pattern moves vertically past apertures 23 and 24, with the result that the beams of light 25 and 26 are modulated in intensity in an approximately sinusoidal manner, the two sinewaves being in quadrature for the reason given above; the sense of the movement of grating 13 determines which of the waves is the leading one. The electrical outputs from photocells 33 and 34 over leads A and B are therefore in the form of signal currents of approximately sinusoidal wave form in quadrature with each other. The frequencies of the two signals are of course equal and are dependent on the speed of movement of grating 13 and on the spacing of the lines on the gratings. As the latter factor is a constant, the frequency of each signal is directly proportional to the speed of the movement of the table.

The use of slotted screen 27 is rendered advisable whenever the ruling of the gratings is fine enough to cause appreciable diffraction at the gratings. The result of this is that the light in beams 25 and 26 is distributed in a series of spectra disposed on each side of the optical axis 40 of the apparatus along a band extending in the direction of movement of grating 13. As only the first-order spectra are well modulated by the movement of grating 13, screen 27 is disposed so that its slot 28 passes only one of these first-order spectra to the photocells. As the centre line of this first-order spectrum is inclined at approximately 3 degrees to the optical axis, the angle of mirror 21 may be adjusted so that the light forming this spectrum emerges from the gratings in a direction normal to them.

The currents in leads A and B—which currents will hereinafter be referred to for convenience as current A and current B—are in quadrature with one another. Which is the leading current depends on the sense of the movement of grating 13 and hence on the sense of the movement of the table 10 with respect to the bed 11. Whenever the movement of the table is in one direction current A leads on current B; whenever the movement is in the opposite direction current B leads on current A. The response of discriminator 35 is to provide an output over only lead C when current A leads, but to provide an output over only lead D when current B leads. The output is in each case in the form of electrical pulses at a repetition frequency directly proportional to the frequency of the output signals from the photocells and hence directly proportional to the rate of movement of the table.

Counter 36, as indicated above, adds the pulses received over lead C and subtracts those received over lead D. The total count at any time is therefore a measurement of the extent of the net movement of the table in one or other of the two opposite directions 37. The counter may be calibrated to indicate this net movement direct, as well as indicate in which of the two directions it lies.

To enable grating 12 to be slightly rotated from the vertical to produce the required skew effect of the superimposed lines, the other end of cantilever spring 14 is secure to one end of a block 63 which is supported from its other end by a hollow boss 64 designed to fit closely in a cylindrical aperture 65 in another block 66 secured to bracket 15. The cylindrical interior of boss 64 is coaxial with optical axis 40, the two beams of light 25 and 26 being allowed to pass through to screen 27. Boss 64 can rotate in aperture 65, thereby allowing block 63, and hence grating 12, to rotate to a small extent around the optical axis. Rotary adjustment of grating 12 is achieved by rotating a cylindrical slug 67 in a further aperture 68 in block 66, this slug having an eccentric pin 69 working in a slot 70 cut in block 63.

Before describing suitable equipment for discriminator 35 and counter 36, some alternative embodiments of the optical part of the apparatus will be briefly indicated. In all of these the thickness of the lines on the gratings is greatly exaggerated.

Figure 3:
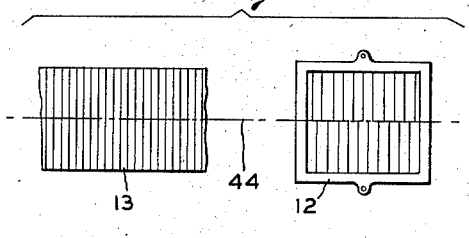

Instead of obtaining the out-of-phase modulation of the light in beams 25 and 26 by means of gratings slightly askew as described above, the effect may be obtained as follows. Two gratings ruled with approximately the same number of lines per unit length are provided. The lines of grating 12 are ruled in two parts, as shown in Fig. 3 (where the gratings are depicted separately and the thickness of the lines greatly exaggerated for clarity), on each side of a centre line 44 which extends in the direction of movement—in this example normal to the lines. The lines of one of these parts are staggered relative to the lines of the other part. The other grating 13 is ruled so that its lines extend without interruption on each side of centre line 44. The gratings are superimposed with the lines in parallel and centre line 44 forming a centre line common to both; there is thus provided a cyclic coincidence pattern in two parts, one above and one below the common centre line, these parts being in quadrature with one another. The elements illuminated through apertures 23 and 24 are located so that one of the illuminated elements of the pattern is above centre line 44 and the other element is below it. Movement of one grating relative to the other in the direction of centre line 44 produces the required quadrature modulation of the light in beams 25 and 26.

Figure 4:
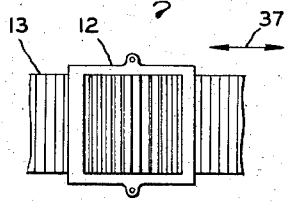

In another embodiment grating 12 is ruled with $m$ straight opaque lines per inch and grating 13 when $n$ straight opaque lines per inch. The gratings are superimposed with the lines in parallel, thereby providing a cyclic coincidence pattern of $(m-n)$ lines per inch, as shown in Fig. 4. In this embodiment the apertures 23 and 24 are spaced apart in the direction of movement— that is, horizontally—at a distance of separation such that the illuminated elements of the pattern are out of phase with one another by a fraction of half the wavelength of the pattern as before; a quadrature relationship is again advisable. Straight-line movement of grating 13 past grating 12 causes the pattern to move horizontally past the apertures, thereby modulating beams 25 and 26.

Figure 5:
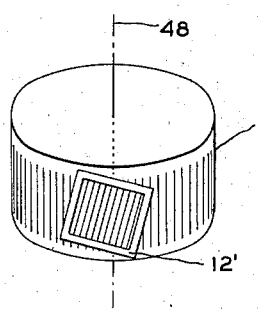

In the embodiments so far described the movement of the object is a straight-line movement. The movement may be other than straight-line. It may for example be circular. The gratings may then be arranged with their lines approximately in parallel with the axis of rotation. For example, as shown in Fig. 5, the long grating 13 of Fig. 1 may be in the form of a cylinder $13^1$ coaxial with the axis 48 of rotation, with the lines lying on the curved surface. The other grating $12^1$ (depicted skewed) may constitute a small portion of the curved surface of a coaxial cylinder, with its lines lying on this surface.

Figure 5A:
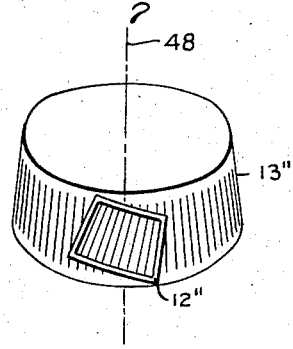

In a modified form of the foregoing arrangement the lines of each grating lie on the curved surface of a cone approximately parallel to its axis, the two cones being coaxial with the axis of the circular movement. See, for example, Fig. 5a wherein the grating $13^{11}$ is of conical form having lines lying on the curved conical surface thereof approximately parallel to the axis of the cone which is also coaxial with the axis 48 of circular movement. The other grating 12" (depicted skewed) may comprise a small portion of a coaxial conical surface with lines thereon lying approximately parallel to its axis.

Or the gratings may be arranged with their lines approximately radial to the axis of rotation. In one such arrangement—see Fig. 6—the movable grating is in the form of a circular disc 50 ruled radially near the periphery of one of the plane faces with opaque lines on a transparent ground; the disc is mounted for rotation with the object whose circular movement is to be measured, the axis of the circular movement passing through the centre 51 of the disc. The fixed grating 52 (depicted separately from grating 50 for clarity) resembles a sector of disc 50, being ruled similarly near its periphery with the same spacing as the lines on disc 50, and is mounted so that the centre 53 of the disc from which the sector is derived is slightly displaced from centre 51 of disc 50, as shown in Fig. 7; this has the effect of slightly skewing the lines of one grating with respect to those of the other grating as in the case of the embodiment first described, thereby producing a similar coincidence pattern. Apertures 23 and 24 are spaced apart in a direction normal to the direction of movement as before, this direction being clearly radial. Complete rotation of the object, and hence of grating 50 relative to grating 52 is allowed. The remaining equipment and its operation are otherwise the same as with the embodiment first described.

The skewing of the lines may alternatively be achieved by making the lines of the sector slightly skewed from the radial and superimposing the sector and the disc with their centres coincident. This arrangement is shown in Fig. 8, where the modified sector is shown at 54 and the common centre at 55. In a further alternative the lines of the sector may be radial and those of the disc slightly skewed. In either case the apertures 23 and 24 are spaced apart radially.

The embodiment of Fig. 8 may be modified so that the coincidence pattern is attained by arranging the lines of the disc or of the sector—the latter as depicted—in two staggered radial parts in a similar manner to that of the embodiment described with reference to Fig. 3, the lines of the disc being ruled radially. The modified sector is depicted at 56 in Fig. 9 and the two parts of its ruling at 57 and 58 separated by a centre line 59. Apertures 23 and 24 are located one on each side of line 59. The apparatus otherwise functions similarly to that of Fig. 3.

The embodiment of Fig. 8 may also be modified by providing both the sector and the disc with radial lines but at different spacings. The arrangement, which is similar to that of Fig. 4, is shown in Fig. 10, where the sector (ruled with $m$ radial lines per inch) is depicted at 61 and the disc ($n$ radial lines per inch) at 62. For this arrangement, of course, apertures 23 and 24 are displaced in the direction of movement, that is, circumferentially.

In any of the embodiments so far described, one of the gratings may be an optical reflecting grating, the source of light being on the same side of the gratings as the photocells. One such arrangement is shown in Fig. 11, representing a much simplified plan view of a part of the apparatus of Fig. 1 suitably modified. The moving grating $13^{11}$ is here the reflecting grating, the lines being ruled on light-reflecting material; the other grating 12 is transparent. As the lines are normal to the plane of the paper they are indicated symbolically by rows of dots. The gratings are illuminated by a lamp $17^1$ through a collimating lens $20^1$ and two apertures (not shown) in a part of the lamp housing $18^1$. The optical axis of the system is indicated at $40^1$. The light passes through grating 12, is reflected by grating $13^{11}$ and returns through grating 12, through slotted screen 27, to mirrors 31 and 32 and the photocells 33 and 34. Movement of grating $13^{11}$ causes modulation of the light beams as before.

Figure 12:
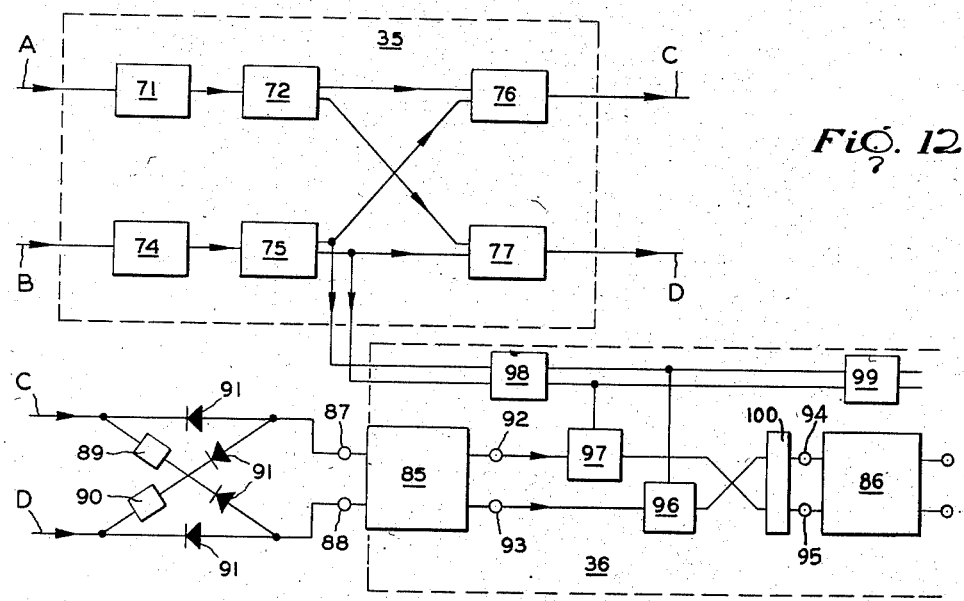
Figure 12 is a schematic diagram of details of electrical equipment shown generally in Fig. 1.

Suitable equipment for discriminator 35 and counter 36 will now be described with reference to the diagram of Fig. 12 and the waveforms of Fig. 13A (current A leading) and Fig. 13B (current B leading).

The discriminator includes an A channel and a B channel fed by signals received from photocells 33 and 34 over leads A and B respectively. The A channel includes a combined D.C. amplifier and squaring stage 71 designed to produce from the A current (Fig. 13 waveform ($a$)) a signal of square waveform ($b$) in synchronism with it. This stage is followed by a pulse-forming stage 72 for deriving from the output of stage 71 a sharp pulse 73 (waveform ($c$)) in coincidence with each negative-going edge of waveform ($b$); a differentiator followed by a rectifier are suitable components for this stage. One pulse is therefore produced in respect of each cycle of the A current. These pulses will be referred to for convenience as the A pulses.

The B channel includes another D.C. amplifier and squaring stage 74 similar to stage 71 to produce from the B current (waveform ($d$)) a signal of square waveform ($e$) in synchronism with it. This signal is applied to a push-pull stage 75 designed to produce a first square-wave output signal ($f$) in phase with signal ($e$) and a second square-wave output signal ($g$) in counterphase.

In the A channel is a gating stage 76 and in the B channel another gating stage 77. These will be referred to for convenience as the A gate and the B gate. Each gate is of the kind designed to produce an output signal only when each of two input signals is positive. The A pulses from stage 72 are applied in a positive-going sense as one of the inputs to each gate. First output signal ($f$) from push-pull stage 75 is applied as the other input to the A gate, whilst the second output signal ($g$) is applied as the other input to the B gate. Each of the gates may conveniently comprise a pentode valve to the control grid and suppressor grid of which are applied the A pulses and the square-wave signals respectively. The valve is biased on both grids to anode current cut-off and is designed to conduct when both the signals on these grids are positive. The outputs from the gates A and B are applied to counter 36 over the above-mentioned leads C and D respectively.

It will be apparent from the above description that:

($a$) There is one A pulse per cycle of each of the first and second output signals ($f$) and ($g$);

($b$) Owing to the quadrature displacement of currents A and B each A pulse 73 occurs in approximate synchronism with the mid point of a square-wave half cycle of those signals; each pulse 73 therefore occurs wholly within a half-cycle period of signals ($f$) and ($g$), that is to say, the pulse does not occur partly in one half-cycle and partly in the next;

($c$) One of the half-cycles with which each A pulse 73 coincides is positive and the other negative, since these signals are in counterphase;

($d$) Each gate 76 and 77 passes the A pulse when the coinciding half-cycle is of positive sense, this sense being predetermined and the same for each gate, and ($e$) The criterion which determines whether these positive half-cycles are those of the first or the second output signals ($f$) or ($g$) is the phase relationship between the quadrature A and B currents, i.e. which is the leading current.

It is assumed that the arrangement is such that when the A current is leading (Fig. 13A), the positive half-cycles coinciding with the A pulses are those half-cycles 80 of the first output signal ($f$); and that when the B current is leading (Fig. 13B), the positive half-cycles coinciding with the A pulses are those half-cycles 81 of the second output signal (g).

When, therefore, the A current is leading, each A pulse arrives at the A gate at a time when the other input signal to the gate is also of positive sense; the result is that this gate passes each A pulse over the above-mentioned lead C. On the other hand each A pulse arrives at the B gate when the other input signal to this gate is negative, for the reason indicated in sub-paragraph (c) above. This gate accordingly remains closed and no pulses are passed over lead D. The pulses to the counter are therefore applied over lead C only.

Similarly when the B current is leading, the A gate is maintained closed and the counter receives pulses over lead D only.

The counter 36 may consist of a sufficient number of scale-of-ten counting tubes connected in cascade and arranged for algebraic summation. The units and tens tubes are shown generally at 85 and 86 respectively. These tubes may be of the Dekatron type; in which case arrangements are made to apply the pulses on lead C to guide ring No. 1 (shown at 87) of the "units" tube 85 with no time-lag and to guide ring No. 2 (shown at 88) with a time-lag supplied by a delay stage 89, and to apply the pulses on lead D to the guide rings 87 and 88 with a time-lag supplied by a delay stage 90, and without a time-lag, respectively. Metal rectifiers 91 are introduced into each of these four connections to the guide rings to prevent interaction.

The 9th and 10th electrodes 92 and 93 of tube 85 are coupled to the appropriate guide rings 95 and 94 of tube 86 by way of gates 97 and 96 and a time-lag network 100. Gates 97 and 96 are controlled respectively by the second and first output signals (f) and (g) from push-pull stage 75 so that pulses from the 10th electrode 93 are passed when addition is required and pulses from the 9th electrode 92 when subtraction is required. As the tube 85 operates with an appreciable time-lag it is necessary to apply these control signals to the gates 96 and 97 through some sort of delay device or network indicated at 98 and to impose an additional delay on these signals by means of a further delay device 99 before applying them to the pair of gates (not shown) between the "tens" tube 86 and the "hundreds" tube (not shown) if supplied. An additional delay must similarly be imposed at each subsequent stage.

Network 100 consists of components similar to components 89, 90 and 91 of the network associated with "units" tube 85, connected in the same manner, so that the pulses from electrode 92 are applied to guide ring 95 with no time-lag but to guide ring 94 with a time-lag, whereas the pulses from electrode 93 are applied to guide rings 95 and 94 with and without a time-lag, respectively. It will be understood that a similar network is used for the "hundreds" and each higher tube.

The operation of the counter need not be described in detail since each tube operates in a known manner, adding or subtracting each pulse in dependence on which of the two guide rings the pulse reaches first.

In the above described embodiment the repetition frequency of the pulses delivered to the counter 36 is the same as the frequency of the cyclic coincidence pattern; in other words, one pulse is delivered to the counter for each cycle of the pattern. The discriminator may be modified to deliver pulses at a faster repetition frequency, such as two or more (up to ten) pulses per cycle of the pattern. The multiplying effect of this procedure on the accuracy of the apparatus is in direct correspondence; if for example the line spacing is $n$ lines per inch and the discriminator produces $p$ pulses per cycle of the pattern, the accuracy corresponds to a spacing of $np$ lines per inch at the one pulse per cycle delivery rate. A form of discriminator 35 modified to produce two pulses per cycle of the pattern will now be described by way of example.

The modification is effected, in brief, by doubling the repetition of the A pulses (to produce one per half cycle of the A current), doubling the frequency of the first and second output signals from the push-pull stage in the B channel, and applying the three signals to the A and B gates as before, after a phase shift that is explained later.

Figure 14:
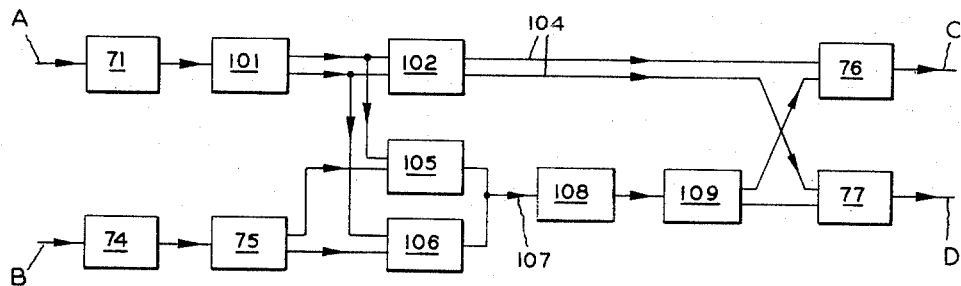
Figure 14 is a schematic diagram of equipment alternative to that of Figure 12.
Figure 15:
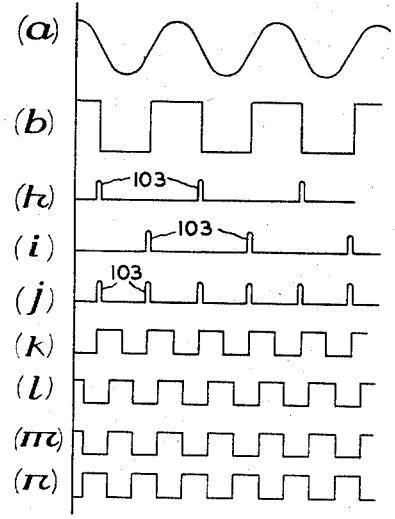
Figure 15 shows waveforms to illustrate the operation of the equipment of Figure 14.

This modification will now be described with reference to Figs. 14 and 15 in which those components and waveforms that are similar to components or wave-forms described above are given the same reference numbers or letters. The waveforms of Fig. 15 are for the case of the A current leading.

To obtain the A pulses, the square-wave signal ($b$) derived from the A current ($a$) by stage 71 is applied to a push-pull stage 101. The two outputs from stage 101 are applied to a pulse-forming stage 102 which produces a sharp pulse 103 in synchronism with the negative-going edge of each waveform in a similar manner to stage 72 of Fig. 12; these signals (waveforms ($h$) and ($i$)) are added in stage 102 to produce over leads 104 the double-frequency train of pulses ($j$).

Figure 13:
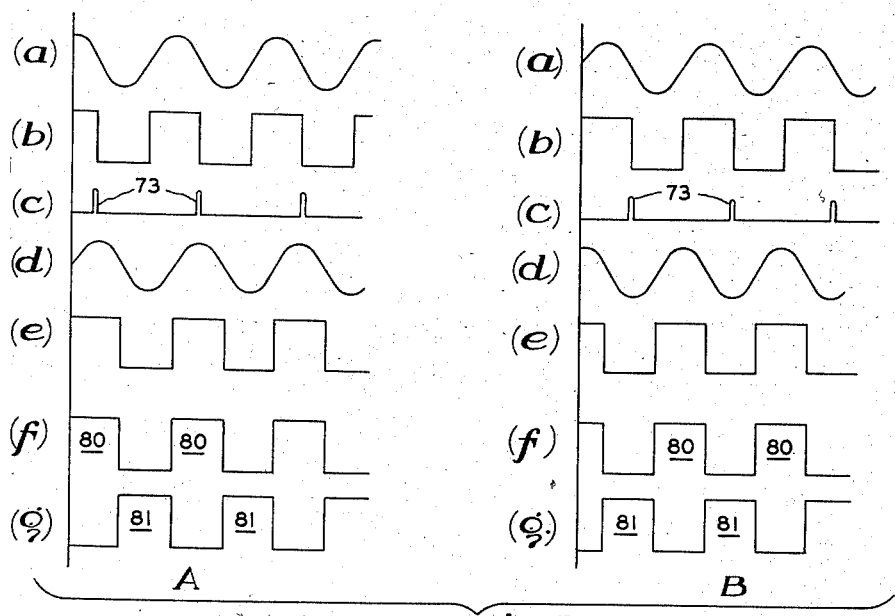
Figure 13 shows electrical waveforms to illustrate the operation of the equipment of Fig. 12.

To double the frequency of the first and second output signals from push-pull stage 75 of channel B (see waveforms ($f$) and ($g$) of Fig. 13), each of these signals is applied together with the nearer in phase of the push-pull output signals from stage 101 to a gating stage 105 or 106, as the case may be. Each gate is designed to produce an output signal only when both input signals are positive. The resultant two signals are added together to produce over an output lead 107 a double-frequency square-wave signal as shown at ($k$). This signal is applied by way of a phase-shifting stage 108 (the function of which is explained below) to a push-pull stage 109. The outputs from stages 102 and 109 are applied to the A gate 76 and the B gate 77 as were the outputs from stages 72 and 75 in the arrangement described with reference to Fig. 12.

The purpose of phase-shifting stage 108 is as follows. From a comparison of waveforms ($j$) and ($k$) it will be seen that the pulses 103 in leads 104 coincide with the positive-going edges of the waveform ($k$) and so would coincide with the edges of the signals produced by applying waveform ($k$) direct to a push-pull stage. In order to produce signals suitable for application to the A and B gates it is clearly necessary to introduce a phase shift to bring each pulse 103 wholly within a half-cycle of each of the corresponding square-wave push-pull signals. This phase-shift is effected by stage 108, the output from which is a signal having the waveform shown at ($l$). It is clear that each pulse 103 lies wholly within a half-cycle of the two waveforms ($m$) and ($n$) produced from waveform ($l$) by push-pull stage 109.

The outputs from the A and B gates are applied over leads C and D to the counter. The operation is otherwise as before, except that the pulses counted have twice the frequency of those of the first-described embodiment for the same rate of movement of the object and the same ruling of the gratings.

Figure 16:
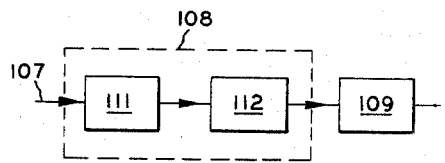
Figure 16 shows in more detail part of the equipment shown in Figure 14.
Figure 17:
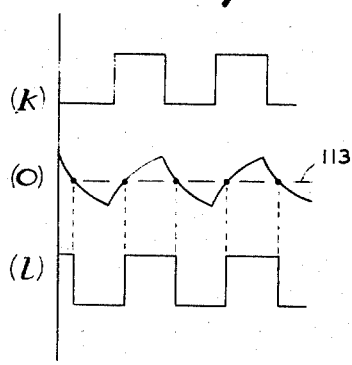
Figure 17 shows waveforms to illustrate the operation of Figure 16.

Suitable equipment for phase-shifting stage 108 will now be described with reference to Figs. 16 and 17. The input from lead 107 is applied to an integrator 111 in which waveform ($k$) is converted to waveform ($o$)—see Fig. 17. The output from stage 111 is applied to a D.C. controlled multivibrator 112 arranged to be switched over each time the applied voltage represented by waveform ($o$) reaches a level indicated by the line 113. A signal with the required phase-shifted waveform ($l$) is thereby produced and applied to push-pull stage 109.

The apparatus may be modified in a similar manner to produce pulses at a repetition frequency of more than twice the frequency of the pattern.

Various details of the apparatus so far described may be modified within the scope of the invention. For example, the two elements of the pattern may be derived by an apertured screen between the gratings and the photocells, instead of between the lamp and the photocells. In the first-described embodiment the lines of the gratings need not be approximately normal to the direction of movement as long as they are inclined to some extent to that direction. Similarly with the embodiment described with reference to Fig. 3. The lines above the centre line may be inclined in a different direction to the lines below the centre line, as long as the lines of each grating are parallel to those of the other grating on the corresponding side of the centre line.

In the discriminators described with reference to Figs. 12 and 14 the two square-wave output signals from stage 75 need not be in phase and counterphase, respectively, with the B current as long as they have a fixed phase relationship with respect to the B current and are of opposite phase to each other. The A and B gates may be modified so that the predetermined sense of the half-cycles that cause the coinciding A pulses to be passed to the counter may be negative, rather than positive; in which case these square-wave signals may be applied to the cathodes of the gating valves.

Any embodiment of the invention described above may be used as a strain gauge, an extensometer, or other instrument in which the extent and sense of the movement of an object in one or other of two opposite directions with respect to some reference structure has to be precisely determined. The invention may also be used for deriving an error signal in a servo system—for example to control the advance of a tool holder along a lathe bed. In such an application two optical gratings, similar to those described above, may be secured to the tool holder and to the lathe bed respectively, the remaining apparatus being as before. As the tool advances towards the workpiece, the output signal from the counter at any given moment represents the net movement in the forward direction made by the tool from a datum position occupied at the start of the machining process, and hence represents the distance of the tool from some datum line. At the same time there is derived—conveniently by photo-electric methods—from a pattern rotated in synchronism with the workpiece a reference signal which at any given angular position of the workpiece represents the correct distance of the tool from the datum line for that position. This reference signal is compared with the output signal from the counter in some kind of comparator designed to yield an output D.C. voltage of appropriate polarity whenever the two signals are unequal as the result of the tool's being in the incorrect position. This voltage, after sufficient amplification, is applied as error signal to advance or retard the tool to the correct position.

What we claim is:
1. Apparatus for determining the extent and sense of the movement of an object in one or other of two opposite directions with respect to some reference structure comprising two superimposed optical gratings, one secured to said structure and the other to said object, said gratings being ruled with equally spaced lines to produce together a cyclic coincidence pattern of alternate opacities and transparencies adapted to move with respect to said structure in dependence on the said movement of said object, means for illuminating said pattern at two locations where the elements of the pattern are out of phase with one another by a fraction of half the cyclic wavelength of the pattern, two photo-electric devices arranged to be illuminated by the light from said illuminated elements of the pattern respectively, and electrical stages for determining the sense of the said movement of said object from the relative phase of the electrical output signals from said photo-electric devices and for determining the extent of said movement from the number of cycles of said output signals which occur during said movement.

2. Apparatus as claimed in claim 1 wherein each of said gratings is ruled with straight opaque lines on light-transmitting material, said lines being equally inclined to some extent to said directions of movement, and the said lines of one grating being slightly skew with respect to the lines of the other grating, and wherein said illuminated elements of the pattern are displaced from each other in a direction approximately parallel to said lines.

3. Apparatus as claimed in claim 1 wherein said gratings are ruled with straight opaque lines on light-transmitting material on each side of a centre line which is common to both gratings and which extends in the direction of said movement, said lines being equally inclined to some extent to said centre line, the lines on one side of said centre line on one grating being parallel to the lines on that side of said centre line on the other grating, and the lines on one side of said centre line on one only of said gratings being staggered with respect to the lines of that grating on the other side of said centre line, and wherein said illuminated elements of the pattern are located one on each side of said centre line.

4. Apparatus as claimed in claim 1 where said movement is a straight line movement, and wherein each grating is such that the lines thereon are parallel and coplanar.

5. Apparatus as claimed in claim 1 where said movement is a circular movement, and wherein each grating is such that the lines thereon are parallel and lie in effect on the curved surface of a cylinder individual to that grating, the two cylinders being coaxial with the axis of said circular movement.

6. Apparatus as claimed in claim 1 where said movement is a circular movement, and wherein each grating is such that the lines thereon lie in effect approximately radially on a plane surface of a disc individual to that grating, the centre of one disc lying on the axis of said circular movement.

7. Apparatus as claimed in claim 1 where said movement is a circular movement, and wherein each grating is such that the lines thereon lie in effect on the curved surface of a cone individual to that grating, the two cones being coaxial with the axis of said circular movement.

8. Apparatus as claimed in claim 1 wherein one of said gratings is ruled on light-reflecting material.

9. Apparatus as claimed in claim 1 wherein one of said electrical stages is a discriminating stage arranged to receive the electrical output signals from said photo-electric devices, to generate a train of pulses the repetition frequency of which is directly proportional to the frequency of said signals, and to deliver said train of pulses over one or other of two output leads in dependence on the relative phase of said signals.

10. Apparatus as claimed in claim 9 wherein said discriminating stage comprises means for deriving first and second square-wave signals of opposite phase to each other, of fixed phase relationship with respect to the output signal of one of said photo-electric devices, and of frequency which is an integral multiple of the frequency of said output signal, means for deriving a pulse signal in respect of each cycle of the other of said square-wave signals, each pulse occurring wholly within a half-cycle period of each of said square-wave signals, and two gating stages associated with said two output leads respectively and adapted to receive said first and said second square-wave signals respectively and said pulse signals, each stage being designed to pass to the associated output lead a said pulse when the coinciding half-cycle of the square-wave signal applied to the gate is of predetermined sense, this sense being the same for each of said gating stages.

11. Apparatus as claimed in claim 9 wherein there is provided a counting stage adapted to count the pulses delivered to this stage over one of said output leads from said discriminating stage and subtract from the count the pulses delivered to this counting stage over the other of said leads.

12. Apparatus for determining the extent and sense of the movement of an object in one or other of two opposite directions with respect to a reference structure comprising two superimposed optical gratings, one secured to said structure and the other to said object, each of said gratings comprising a plurality of opaque lines ruled on light-transmitting material and inclined at substantially the same angle to said directions of movement, the number of lines per unit length of one grating being substantially equal to the number of lines per unit length of the other grating, said gratings being so superimposed as to produce a cyclic coincidence pattern of alternate opacities and transparencies which is adapted to move relative to said structure in dependence on the movement of said object with resepect to said structure, means for illuminating said pattern at two locations where the elements of the pattern are out of phase with one another by a fraction of half the cyclic wavelength of the pattern, two photo-electric devices arranged to be illuminated by the light from said illuminated elements of the pattern respectively, and means responsive to the relative phase of the electrical output signals from said photo-electric devices for determining the sense of the movement of said object with respect to said structure and to the number of cycles of said output signals which occur during said movement for determining the extent of said movement.

13. Apparatus as claimed in claim 12 wherein the two gratings are so superimposed that the opaque lines of one of said gratings are slightly skew with respect to the lines of the other grating.

14. Apparatus as claimed in claim 13 wherein the illuminated elements of the pattern are displaced from each other along a line approximately parallel to the opaque lines on one of said gratings.

15. Apparatus as claimed in claim 12 wherein the opaque lines on each grating are parallel to each other and at least one of said gratings is so mounted that the lines thereof are substantially normal to the directions of movement of the object relative to the reference structure.

16. Apparatus as claimed in claim 12 wherein the movement of the object relative to the reference structure is a straight-line movement and the opaque lines on each grating are parallel to each other and coplanar, at least one of said gratings being so mounted that the lines thereof are substantially normal to the directions of said straight-line movement.

17. Apparatus as claimed in claim 12 wherein the movement of the object relative to the reference structure is a circular movement and each of said gratings comprises a curved surface substantially coaxial with the axis of said circular movement, the opaque lines on each of said gratings being parallel to each other.

18. Apparatus as claimed in claim 12 wherein the movement of the object relative to the reference structure is a circular movement and each of said gratings comprises a disc-like member at least partially circular in form whereon the opaque lines are radially arranged with respect to a centre, the centre of at least one of said grating members lying on the axis of said circular movement.

19. Apparatus as claimed in claim 12 including a light source and a pair of spaced apertures through which beams of light from said source are projected toward said gratings to illuminate said pattern, said apertures being displaced from each other along a line substantially normal to the directions of movement of the object relative to the reference structure.

20. Apparatus as claimed in claim 12 including a light source and a pair of spaced apertures through which beams of light from said source are projected toward said gratings to illuminate said pattern, said apertures being displaced from each other along a line substantially parallel to the directions of movement of the object relative to the reference structure.

21. Apparatus for determining the extent and sense of the movement of an object in one or other of two opposite directions with respect to a reference structure comprising two optical gratings, one secured to said structure and the other to said object, said gratings being disposed to produce a light pattern which undergoes a cyclic variation in response to relative displacement between said gratings, means for illuminating said pattern at two locations where the elements of the pattern are out of phase with one another by a fraction of half the cyclic wavelength of the pattern, two photo-electric devices arranged to be illuminated by the light from said illuminated elements of the pattern respectively, and electrical stages for determining the sense of the said movement of said object from the relative phase of the electrical output signals from said photo-electric devices and for determining the extent of said movement from the number of cycles of said output signals which occur during said movement.

22. Apparatus for determining the extent and sense of the movement of an object in one or other of two opposite directions with respect to a reference structure comprising two optical gratings, one secured to said structure and the other to said object, said gratings being disposed to produce a light pattern which undergoes a cyclic variation in response to relative displacement between said gratings, photo-electrically sensitive means for observing said light pattern and responsive electrically to cyclic variations of said pattern at two locations where the elements of the pattern are out of phase with one another by a fraction of half the cyclic wavelength of the pattern, and means responsive to the relative phase of the electrical output signals from said photo-electrically sensitive means for determining the sense of the movement of said object with respect to said structure and to the number of cycles of said output signals which occur during said movement for determining the extent of said movement.

References Cited in the file of this patent

UNITED STATES PATENTS

| | | |
|---|---|---|
| 1,811,895 | Ranger | June 30, 1931 |
| 1,877,566 | Elsey et al. | Sept. 13, 1932 |
| 2,351,955 | Graf | June 20, 1944 |
| 2,397,971 | Martinec | Apr. 9, 1946 |
| 2,416,968 | Turrettini | Mar. 4, 1947 |
| 2,439,392 | Jones | Apr. 13, 1948 |
| 2,451,972 | Powers | Oct. 19, 1948 |
| 2,471,788 | Snyder et al. | May 31, 1949 |
| 2,557,219 | Flint et al. | June 19, 1951 |
| 2,562,181 | Frommer | July 31, 1951 |
| 2,641,458 | Gilvarry | June 9, 1953 |
| 2,651,771 | Palmer | Sept. 8, 1953 |
| 2,656,106 | Stabler | Oct. 20, 1953 |
| 2,694,804 | Wagner | Nov. 16, 1954 |
| 2,857,802 | Cail | Oct. 28, 1958 |